July 13, 1965  P. HÄRTER ETAL  3,194,135
AUTOMATIC EXPOSURE CONTROL MECHANISM FOR PHOTOGRAPHIC CAMERAS
Filed Sept. 27, 1962  2 Sheets-Sheet 1

PAUL HÄRTER AND
HELMUT ETTISCHER
INVENTORS

BY R. Frank Smith
Robert W. Hampton
ATTORNEYS

July 13, 1965 P. HÄRTER ETAL 3,194,135
AUTOMATIC EXPOSURE CONTROL MECHANISM FOR PHOTOGRAPHIC CAMERAS
Filed Sept. 27, 1962 2 Sheets-Sheet 2

PAUL HARTER AND
HELMUT ETTISCHER
*INVENTORS*

BY R. Frank Smith
Robert W. Hampton

ATTORNEYS

United States Patent Office 3,194,135
Patented July 13, 1965

3,194,135
AUTOMATIC EXPOSURE CONTROL MECHANISM FOR PHOTOGRAPHIC CAMERAS
Paul Härter and Helmut Ettischer, Ruit, Kreis Esslingen, Germany, assignors to Eastman Kodak Company, Rochester, N.Y.
Filed Sept. 27, 1962, Ser. No. 226,699
Claims priority, application Germany, Nov. 2, 1961, K 39,608
4 Claims. (Cl. 95—10)

The present invention relates to photographic cameras, preferably those having photoelectric exposure control systems, and more particularly concerns means for compensating the exposure control systems of such cameras for interchangeable lenses of various maximum apertures.

Cameras that are adapted to receive interchangeable lenses of various maximum apertures are well known in the art. Commonly the diaphragm and/or shutter speed setting of such camera is coupled with an exposure meter. The different maximum apertures of the various lenses are compensated, typically, by coupling the exposure meter to the lens diaphragm by means of compensating cams. When a lens is inserted into the camera, the exposure meter can be adjusted to a reading corresponding to the maximum aperture of that lens, for example by automatically adjusting a diaphragm or mask that lies in front of the photocell. However, such structure is undesirably complicated and expensive.

In another structure, compensation for the different maximum apertures of interchangeable lenses is achieved by providing several index marks within the range of the meter pointer, each such mark being associated with the maximum aperture of a respective one of the interchangeable lenses. For the correct camera adjustment the pointer is set manually at the mark corresponding to the inserted lens. Although this structure is somewhat simpler it is nevertheless more complex and expensive than would be desirable, and it requires a manual adjustment, which of course is subject to error.

It is therefore an object of the invention to provide a simple, inexpensive transmission device between interchangeable lenses and an exposure control system to compensate the latter for the various maximum apertures of such lenses. This object is achieved by turning the body of the exposure meter measuring instrument, and by moving the diaphragm scale member, as functions of the maximum aperture of each such lens that is attached to the camera.

Another object, which is achieved by the above means, is to compensate for the maximum aperture of an attached lens without disturbing the settings of shutter speed and/or film speed.

Other objects of the invention will appear from the following description, reference being made to the accompanying drawings, wherein.

Figure 1:
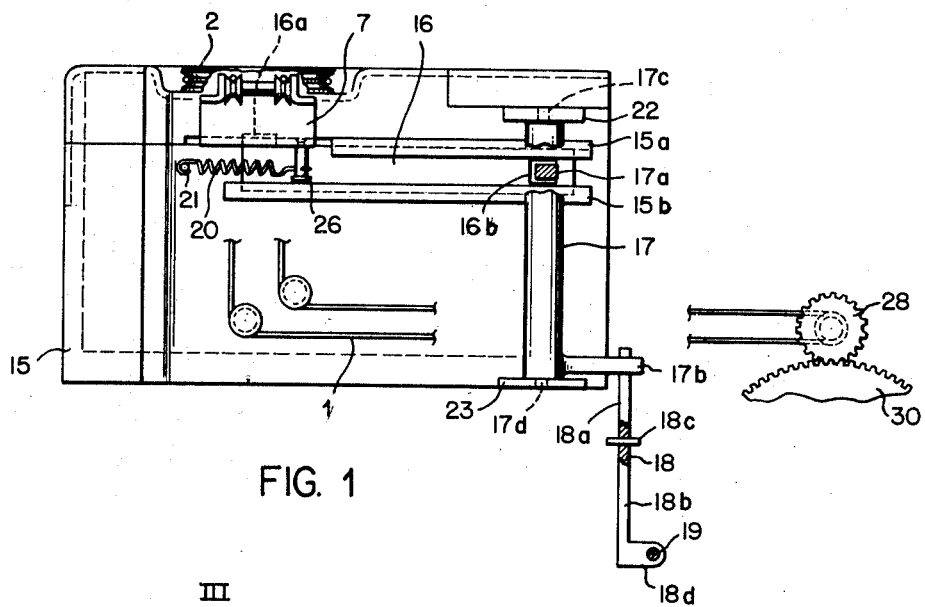
FIG. 1 is a front view of the housing for the invention, showing a portion of the compensating linkage.
Figure 2:
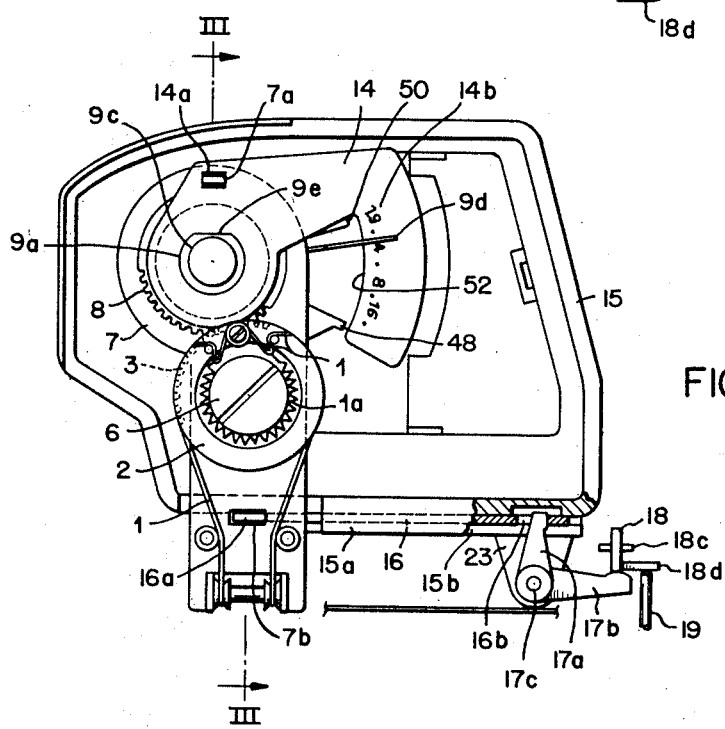
FIG. 2 is a top view of the invention with its housing cover removed.
Figure 3:
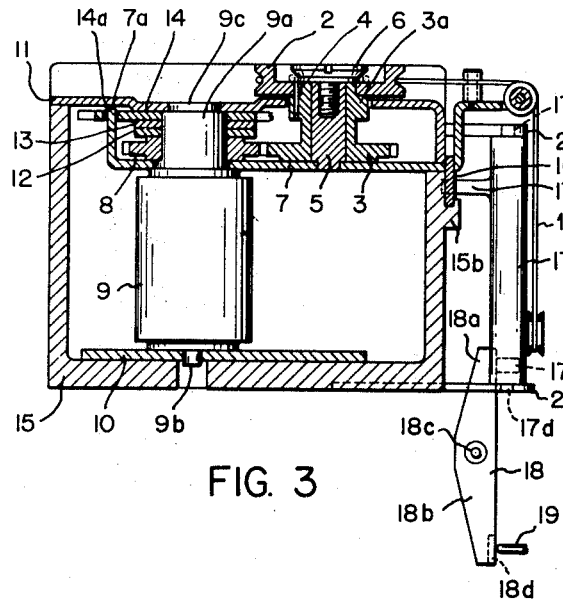
FIG. 3 is a sectional side view of the invention taken along the line III—III of FIG. 2.

Referring to FIGS. 1 to 3, a cable 1 couples a compensating drum 2 with a gear 28, which is in mesh with the toothed periphery of a setting member 30 for one or more exposure factors, e.g., exposure time and/or film speed. A spring 1a maintains tension in cable 1.

The compensating drum is detachably keyed to the hub 3a of a gear 3 and rotates with gear 3, which is pivoted on a bolt 5 together with the compensating drum 2. Drum 2 and gear 3 are held in position by a screw 6. Bolt 5 is riveted into a carrier plate 7.

Gear 3 engages a gear 8 mounted on a journal 9a, which is integral with the measuring instrument 9 of an exposure meter and concentric with an axis of rotation for the instrument body. A flat surface 9e on journal 9a is keyed to gear 8 and prevents that gear from turning relative to the instrument. The instrument is pivotally mounted by stub shafts 9b and 9c in a frame member 10 and a cover plate 11, respectively. Carrier plate 7, a pair of limit members 12 and 13, hereinafter described, and a member 14, carrying a diaphragm scale 14b, are all pivotally mounted on journal 9a of the instrument 9. A lug 7a formed near one end of carrier plate 7 engages a slot 14a of the scale member 14, such that the carrier plate and the scale member turn as a unit about the instrument axis.

A slide 16 is arranged at one side wall of a housing 15 and is guided by a pair of fixed tracks 15a and 15b. A lug 16a on slide 16 engages a slot 7b of carrier plate 7, so that movement of the slide along its tracks rocks carrier plate 7 and scale member 14 about the instrument axis. A slot 16b in slide 16 is engaged by a first arm 17a of an elongated transmission member 17, which is pivotally mounted in frame members 22 and 23 by a pair of pins 17c and 17d, respectively.

Figure 4:
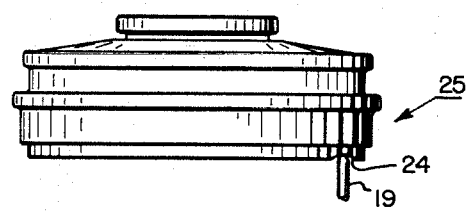
FIG. 4 is a top view of an interchangeable lens assembly showing its cooperation with the sensing pin of the invention.

The transmission member 17 is coupled by a second arm 17b with an arm 18a of a lever 18, which is pivotally mounted at 18c. An ear 18d of lever 18 cooperates with a sensing pin 19, which is adapted to engage a surface irregularity, illustrated as a depression 24 (FIG. 4) in each of a plurality of interchangeable lens assemblies 25. The configuration of the surface irregularity, e.g., the depth of the depression 24, in each lens assembly is a function of the maximum aperture of the lens in that assembly, and pin 19 is positioned accordingly.

A spring 20 (FIG. 1) has one end attached to a stud 21, which is connected with housing 15, and has its other end attached to a bolt 26, which is integral with carrier plate 7. Spring 20 urges the carrier plate clockwise (as viewed in FIG. 2) about the instrument axis and therefore urges slide 16 to the left, transmission member 17 counterclockwise (as viewed in FIG. 2), lever 18 counterclockwise (as viewed in FIG. 3), and sensing pin 19 into engagement with depression 24 (FIG. 4) of the attached lens assembly.

Figure 5:
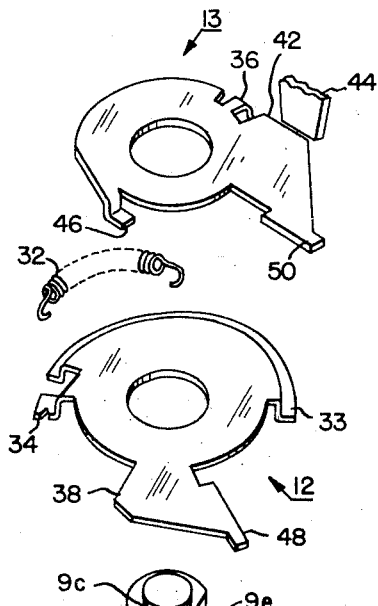
FIG. 5 is an exploded perspective view of the range-limiting mechanism for the exposure meter.

The previously mentioned limit members 12 and 13 (FIG. 3) are shown in detail in FIG. 5.

A pair of pointers 48 and 50 on members 12 and 13, respectively, cooperate with instrument pointer 9d to limit the range of the exposure meter in accordance with the positions of members 12 and 13. This, in turn, establishes limits for the exposure control system of the camera, whether that system be fully automatic or semi-automatic.

A spring 32 is located on a ledge 33 formed from a peripheral portion of limit member 12 and has its ends connected to a pair of ears 34 and 36 of the respective limit members 12 and 13, urging member 12 clockwise, and member 13 counterclockwise, about the instrument axis. The clockwise movement of member 12 is limited at the upper extreme of the scale range by engagement of a surface 38 of pointer 48 with an ear 40 on the instrument 9. Counterclockwise movement of member 13 is limited at the lower extreme of the scale range by engagement of a surface 42 of pointer 50 with an ear 44, which is integral with the housing cover 11 (FIG. 3).

When the measuring instrument 9 is turned counterclockwise its ear 40 (FIG. 5), in engagement with surface 38 on member 12, turns the latter member counterclockwise about the instrument axis to modify the effective upper limit of the scale range in accordance with the new instrument position. Similarly, when the instrument body is turned clockwise ear 40, in engagement with an ear 46 on member 13, turns that member clockwise to modify the effective lower limit of the scale range.

Limit pointers 48 and 50 preferably are visible with the instrument pointer 9d in a window 52 (FIG. 2) in the housing cover.

The mode of operation is as follows:

When the exposure time and/or the film speed are set manually, in a manner well known in the art, the compensating drum 2 and gear 3 are turned by way of the cable 1, thereby turning gear 8 and instrument 9. The meter pointer 9d is deflected in the usual manner as a function of scene brightness and indicates a lens aperture value on scale 14b, this value depending on the selected exposure time and/or film speed, as well as on scene brightness. The two limit members 12 and 13 are adjusted along with the instrument 9.

Upon attachment of a lens assembly, the sensing pin 19 is moved to a new position corresponding to the maximum aperture of the lens in that assembly. The movement of pin 19 is transmitted by way of the lever 18 and transmission member 17 to slide 16. By means of lug 16a, slide 16 pivots carrier plate 7, bolt 5, compensating drum 2 and gear 3 about the instrument axis. Gear 3 does not turn significantly about its own axis at this time. Therefore, its movement with carrier plate 7 about the instrument axis causes gear 8 and instrument 9 to turn about their common axis by an amount corresponding to the maximum aperture of the attached lens.

During the pivotal movement of carrier plate 7, the scale member 14, together with its diaphragm scale 14b, is turned by means of the lug 7a, so that the aperture indicated on the scale, and therefore the setting of any exposure control system influenced by the meter, does not change.

The invention has been described in detail with particular reference to preferred embodiments thereof, but it will be understood that variations and modifications can be effected within the spirit and scope of the invention as described hereinabove and as defined in the appended claims.

We claim:

1. In a photographic camera having an exposure control system including a movably mounted measuring instrument with a pointer deflectable as a function of scene brightness, said camera being adapted to have attached thereto any of a plurality of interchangeable lens assemblies having respective lenses with different maximum apertures, means to compensate said exposure control system for the maximum aperture of the lens in any of said lens assemblies that is attached to said camera, said compensating means comprising, in combination: means defining a surface irregularity on each of said lens assemblies; a sensing member in said camera; means yieldably maintaining said sensing member in engagement with the surface irregularity of any of said lens assemblies that is attached to said camera; means coupling said sensing member to said instrument for positioning the latter as a function of the maximum aperture of the lens in said attached lens assembly; a pair of individually movable limit members cooperating with said pointer to limit its deflection in opposite directions; spring means urging said limit members toward each other in directions tending to reduce the range of deflection of said pointer; and respective means coupled to said instrument for limiting movement of each of said limit members toward the other, whereby movement of said instrument in either direction permits a compensating movement of one of said limit means by said spring means.

2. The combination defined in claim 1, wherein said pointer is deflected about a predetermined axis and said instrument is pivotally mounted on said axis.

3. The combination defined in claim 2, with: a scale member bearing a diaphragm aperture scale cooperating with said pointer, said scale member being pivotally mounted on said axis; and means coupling said scale member to said sensing member for pivoting said scale member in conjunction with said compensating movement of said instrument, whereby the relative positions of said pointer and said scale are substantially unchanged during said compensating movement of said instrument.

4. In a photographic camera having an exposure control system including a measuring instrument pivotally mounted about an axis, said instrument having a pointer deflectable about said axis as a function of scene brightness, said camera being adapted to have attached thereto any of a plurality of interchangeable lens assemblies having respective lenses with different maximum apertures, the combination comprising: a member pivotally mounted on said axis and bearing a scale of diaphragm apertures disposed in cooperative relation with said pointer; means for turning said instrument about said axis relative to said scale to compensate for changes in at least one exposure factor; means cooperating with any of said lens assemblies that is attached to said camera for turning both said instrument and said scale member in the same angular direction and through substantially equal angular increments to compensate for the maximum aperture of the lens in said attached lens assembly; a pair of individually movable limit members pivotally mounted on said axis and cooperating with said pointer to limit its deflection in opposite directions; spring means urging said limit members toward each other in directions tending to reduce the range of deflection of said pointers; and respective means coupled to said instrument for limiting movement of each of said limit members toward the other, whereby movement of said instrument in either direction permits a compensating movement of one of said limit means by said spring means.

References Cited by the Examiner
UNITED STATES PATENTS
3,071,054   1/63   Singer _____ 95—10

NORTON ANSHER, Primary Examiner.
DELBERT B. LOWE, Examiner.